United States Patent
Gerum

(10) Patent No.: US 7,762,069 B2
(45) Date of Patent: Jul. 27, 2010

(54) METHOD AND DEVICE FOR INCREASING THE TORQUE OF A RECIPROCATING PISTON INTERNAL COMBUSTION ENGINE, IN PARTICULAR OF A DIESEL ENGINE

(75) Inventor: Eduard Gerum, Rosenheim (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 11/729,926

(22) Filed: Mar. 30, 2007

(65) Prior Publication Data

US 2007/0246008 A1 Oct. 25, 2007

Related U.S. Application Data

(63) Continuation of application No. PCT/EP2005/010569, filed on Sep. 30, 2005.

(30) Foreign Application Priority Data

Oct. 1, 2004 (DE) .................. 10 2004 047 975

(51) Int. Cl.
*F02B 33/44* (2006.01)

(52) U.S. Cl. .................. 60/611; 123/585; 123/586

(58) Field of Classification Search .................. 60/611; 123/585, 586
See application file for complete search history.

(56) References Cited

U.S. PATENT DOCUMENTS

| 4,162,668 | A | * | 7/1979 | Jacob et al. | .................. 123/585 |
| 4,714,483 | A | * | 12/1987 | Koening et al. | ................ 96/113 |
| 5,064,423 | A | * | 11/1991 | Lorenz et al. | .................. 60/611 |
| 5,636,619 | A | * | 6/1997 | Poola et al. | .................. 123/585 |
| 5,819,538 | A | * | 10/1998 | Lawson, Jr. | .................. 60/611 |
| 5,878,714 | A |   | 3/1999 | Dai et al. |  |
| 6,826,910 | B1 | * | 12/2004 | Easton | .................. 60/597 |
| 7,314,043 | B1 | * | 1/2008 | Berger et al. | ................ 123/585 |
| 2001/0002379 | A1 |   | 5/2001 | Schechter |  |

FOREIGN PATENT DOCUMENTS

| CN | 2554363 Y | 6/2003 |
| DE | 37 37 743 A1 | 5/1989 |
| DE | 3737743 A1 * | 5/1989 |
| DE | 198 37 094 C1 | 2/2000 |

(Continued)

OTHER PUBLICATIONS

International Search Report dated Dec. 7, 2005 w/English translation (Six (6) pages).

(Continued)

*Primary Examiner*—Thomas E Denion
*Assistant Examiner*—Mary A Davis
(74) *Attorney, Agent, or Firm*—Crowell & Moring LLP

(57) ABSTRACT

A method and apparatus for increasing the torque of a reciprocating piston internal combustion engine, is described. The method and device includes compressing air from a charge air line or from a second air inlet by using the charge air compressor, storing the air compressed by the charge air compressor in a storage device, and blowing, in a timed manner, blow air which is stored as compressed air in a storage device into the cylinder through an inlet valve of the cylinder, thereby increasing the torque of the engine.

16 Claims, 4 Drawing Sheets

FOREIGN PATENT DOCUMENTS

| | | |
|---|---|---|
| DE | 199 13 157 A1 | 10/2000 |
| DE | 199 60 561 C1 | 1/2001 |
| DE | 199 44 946 A1 | 3/2001 |
| DE | 101 29 976 A1 | 1/2003 |
| DE | 102 24 719 A1 | 12/2003 |
| DE | 10224719 A1 * | 12/2003 |
| DE | 102 39 110 A1 | 3/2004 |
| DE | 10239110 A1 * | 3/2004 |
| WO | WO 97/41346 A1 | 11/1997 |
| WO | WO 2004/072448 A2 | 8/2004 |
| WO | WO2007006274 A1 * | 5/2007 |

OTHER PUBLICATIONS

PCT/EP2005/010569 with English translation (Fourteen (14) pages).
Chinese Office Action dated Dec. 5, 2008 w/English translation (seventeen (17) pages).

* cited by examiner

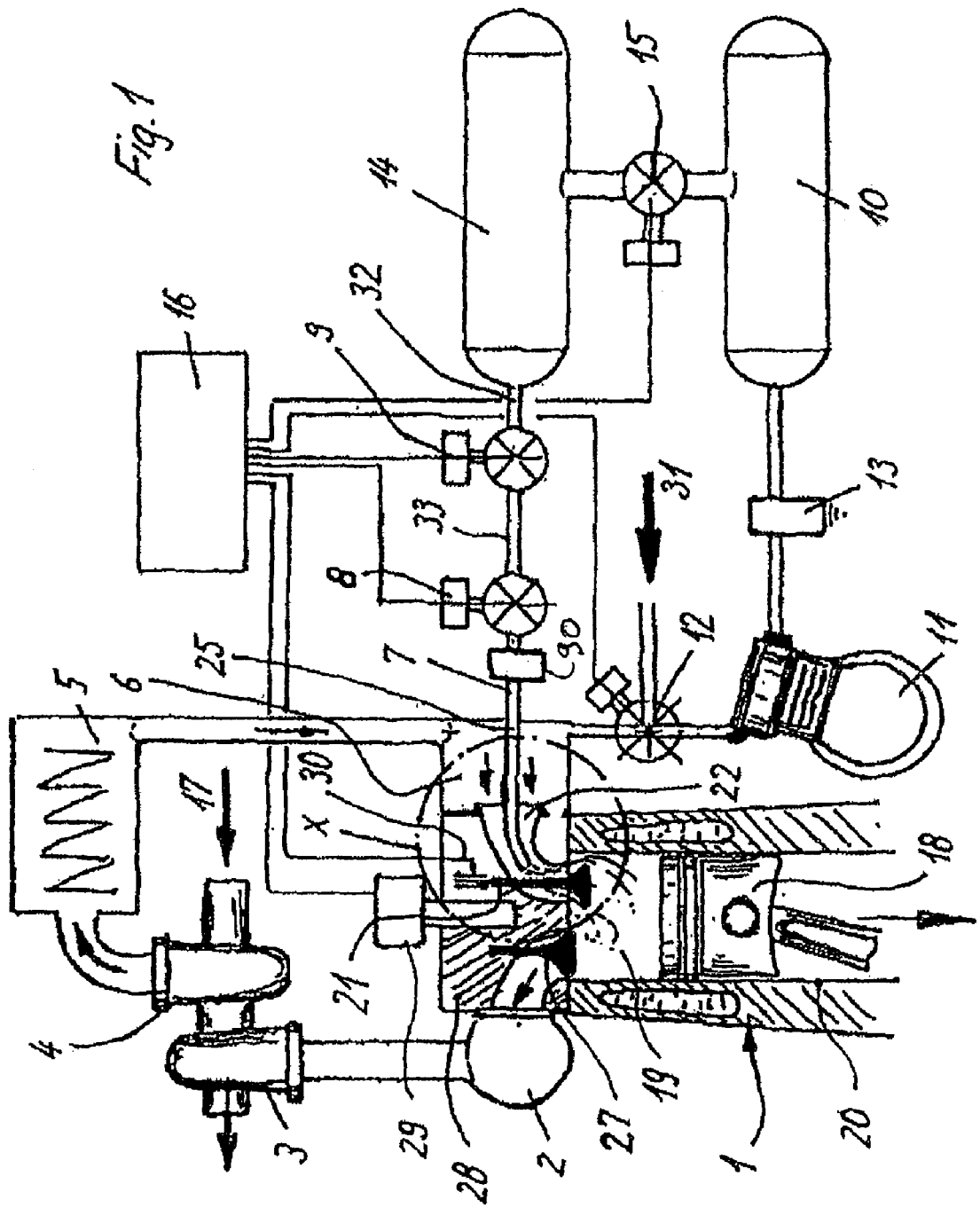

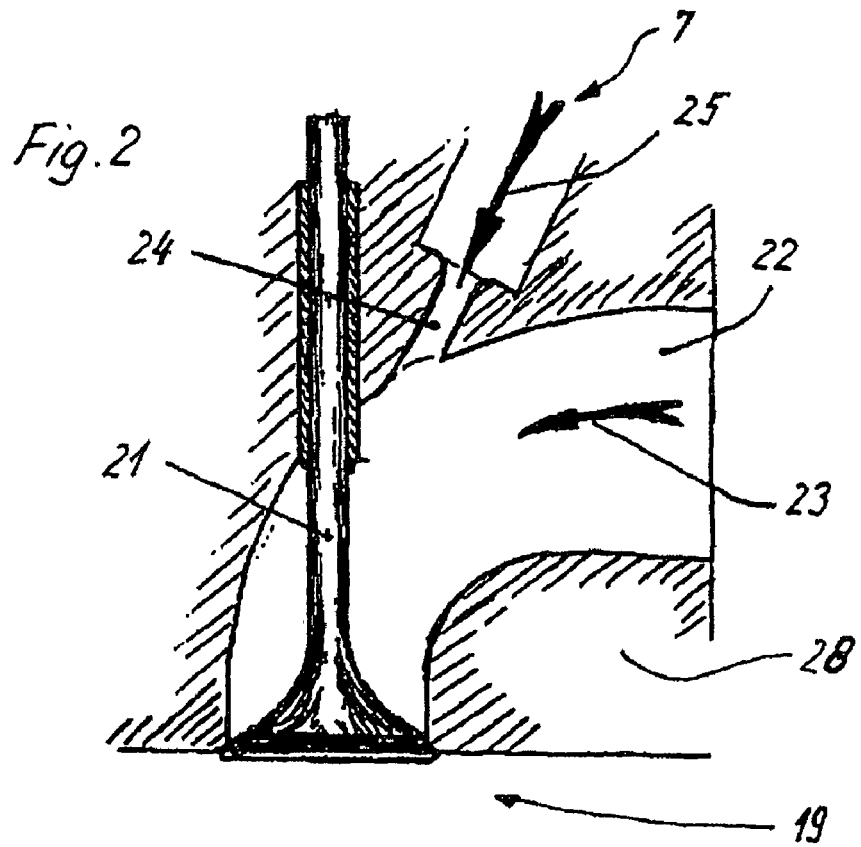
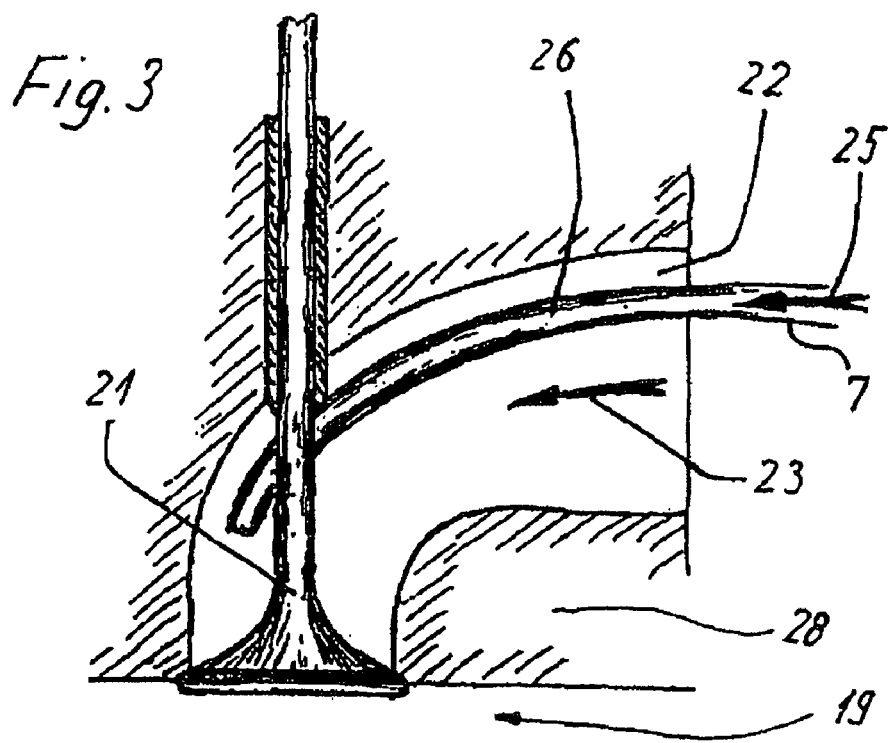

METHOD AND DEVICE FOR INCREASING THE TORQUE OF A RECIPROCATING PISTON INTERNAL COMBUSTION ENGINE, IN PARTICULAR OF A DIESEL ENGINE

CROSS REFERENCE TO RELATED APPLICATIONS

This application is a continuation of PCT International Application No. PCT/EP2005/010569, filed Sep. 30, 2005, which claims priority under 35 U.S.C. §119 to German Patent Application No. 10 2004 047 975.5 filed Oct. 1, 2004, the entire disclosures of which are herein expressly incorporated by reference.

BACKGROUND AND SUMMARY OF THE INVENTION

The invention relates to a method and a device for increasing the torque of a reciprocating piston internal combustion engine, in particular of a diesel engine, having in each case at least one cylinder, one turbine, one compressor, one air compressor, one storage device, one charge air line, preferably one air dryer and/or one charge air cooler, one feed valve and one control device.

The power of such diesel engines which are charged by turbocharger devices which have a turbine and a compressor is being increased more and more for an engine size which is the same or smaller. In the case of diesel engines which are charged in one stage, that is to say in the case of engines with just one turbocharger device, a sufficient charge pressure of the inlet air and thus a specific sufficient torque of the engine must also be available at low engine speeds. This problem occurs in particular given the current downsizing of engines which involves heavy engines with a large cubic capacity being replaced by more lightweight engines with a small cubic capacity and a significantly increased specific power.

In this context the central problem which is to be solved when downsizing is to generate a high torque, which should correspond to the relatively large engine, when starting the engine and engaging it.

The torque gradient and power gradient between the changing of the load and of the rotational speed, which large engines can span to a certain extent with their flywheel effect, can be covered in relatively small engines with rapidly available increased combustion chamber pressures.

In the prior art, what are referred to as turbochargers with a variable geometry (VNT) are already known for solving this problem, these turbochargers already permitting an increased charge pressure at very low engine speeds and thus allowing better filling of the cylinder and thus a higher injection rate of fuel. As a result, the engine power and torque are considerably increased. A disadvantage of this supercharging technology is that this VNT turbocharger is very complicated and thus expensive. Despite all these measures it still has a limited degree of supercharging in the low load range and a generally worse level of efficiency.

It is also known, in vehicles with a diesel engine with a compressed air brake system, to extract compressed air from a compressed air storage device which, for safety reasons, is separate from the actual brake system, the supply of this additional blow air quantity being generated by an air compressor which is increased in size compared to the standard compressed air brake system. This "additional air" is fed to the engine into the intake system, that is to say upstream or downstream of the turbocharger, in the acceleration phase. It is also known that as a result of this it is possible to raise the torque in the low load range. On the other hand, the high air flow rate which is required and which is produced by the fact that the additional air is not fed to the individual cylinders on a selective and timed basis is disadvantageous.

The invention therefore has one object of increasing the engine power and the torque in a simpler way than is the case in the prior art, and of eliminating the abovementioned disadvantages, or at least considerably reducing them.

The object may be achieved by using a method for increasing the torque of a reciprocating piston internal combustion engine, having at least a cylinder, a turbine, a compressor, an air compressor, a storage device, a charge air line, and a control device, the method including the acts of compressing air from one of a charge air line and a second air inlet with the air compressor. The method further includes storing the air compressed by the air compressor in a storage device, and performing timed blowing in of blow air stored as compressed air in the storage device into the cylinder through an inlet valve of the cylinder.

The invention provides a method in which additional air is fed in a clocked or timed fashion to each cylinder of the engine individually, during the intake phase in the low load range.

The method for increasing the torque of a reciprocating piston internal combustion engine, in particular of a diesel engine, having in each case at least one cylinder, one turbine, one compressor, one air compressor, one storage device, one charge air cooler in a charge air line, one air dryer and one control device, includes the following method steps:

compression of air from a charge air line or from a second air inlet by the air compressor;

storage of air compressed by the air compressor in a storage device; and timed blowing in of blow air which is stored as compressed air in a storage device into the cylinder, through an inlet valve of the cylinder, in order to increase the torque of the engine.

This advantageously ensures that the quantity of additional blow air is consumed only with an order of magnitude which corresponds to the respective operating state of the engine. This also saves storage space for this blow air and the associated compressor power. This method is suitable for vehicles with and without a compressed air brake system.

In vehicles with a compressed air brake system, it is particularly advantageous that in the storage method step the compressed air is firstly fed into a first storage device and stored there, and that the air which is stored in the first storage device is fed into a second storage device via a feed valve for storage in the second storage device if a specific quantity of air is present at a specific pressure in the first storage device.

In one exemplary embodiment of the present invention, the feed valve is controlled by the control device, advantageously ensuring that the compressed air brake system does not suffer any loss of compressed air. At the same time it is possible to check the pressure.

In one preferred embodiment according to the invention, the method step of timed blowing in has the following substeps:

determination of the operating state of the engine and of the vehicle by using data of an engine control computer and/or suitable measured value signal transmitters using the control device;

sensing of the position of the inlet valve using a measured value signal transmitter and transmitting this information to the control device;

sensing a pressure in the second storage device using a measured value signal transmitter and/or using a pressure regulator and a charge pressure in the charge air line and transmitting this information to the control device;

blowing in of blow air into the cylinder by opening the control valve in a connecting line from the second storage device to the inlet valve by using the control device in order to blow in blow air, if the inlet valve is opened and an operating state of the engine in the low load range is present; and terminating the blowing in of blow air into the cylinder if the inlet valve is closed or there is a sufficient charge pressure of the compressor; and adapting an increased injection quantity in accordance with the data available.

In this configuration, the particular advantage lies in the timed blowing in of the additional blow air as a function of the position of the inlet valve and further operating conditions. Additional air is advantageously blown in only if it is actually needed. As a result, a great saving is achieved.

In a further exemplary embodiment, in the blowing in substep, a time segment for opening the control valve is defined by the control device using a predefinable or stored data value. This ensures that the blow air of the flow which is present in the inlet duct is superimposed on the charge air, and thus a temperature exchange of these gases can take place. Furthermore, this predefinable time segment advantageously ensures that when there is a specific time period of blowing in this blowing in process is ended early enough to prevent flowing back of the blow air from the cylinder into the intake system or the charge air line and causing faults there.

In a particularly preferred embodiment, the control device adjusts the quantity of the blow air as a function of the respective operating state of the engine and of the vehicle with the pressure regulator. This ensures a particularly effective increase in power of the engine since the blow quantity is dependent on a plurality of operating parameters. For this purpose, it is also an additional large advantage that the quantity of blow air, the control times of the inlet valve and an injection rate of fuel into the engine are adjusted so as to be matched to one another by the control device as a function of the operating state of the engine by using predefinable stored table values.

A further embodiment provides for the control times and a stroke of the inlet valve or the control times or the stroke of the inlet valve to be adjusted.

In a preferred embodiment, an inlet of the air compressor is respectively connected via a changeover valve to a second air inlet or to the charge air line as a function of a pressure prevailing in the charge air line. This advantageously increases the delivery capacity of the air compressor and avoids use of a larger and more expensive air compressor.

An exemplary device for increasing the torque of a reciprocating piston internal combustion engine, in particular of a diesel engine, having in each case at least one cylinder, one turbine, one compressor, one air compressor, one storage device, one charge air cooler in a charge air line, preferably one air dryer, one feed valve and one control device includes an outlet of the storage device that is connected to an inlet duct in the cylinder head of the engine through an air blowing in line via a control valve. The control valve makes it advantageously possible to control the blow air by virtue of the fact that this valve is opened by the control device only if it is necessary to blow in blow air owing to the operating conditions.

In a vehicle with a compressed air brake system, an inlet of a second storage device is connected to a first storage device via a feed valve. The compressed air brake system with its storage device and its compressed air generating apparatus can thus also be used for generating compressed air for the blow air, the second storage device constituting a particular safety feature for the compressed air brake system since it forms a separate compressed air circuit for blowing in the compressed air which is stored in it.

In an exemplary embodiment, the control valve and the outlet of the second storage device are connected via a pressure regulator, this pressure regulator providing the possibility of permitting the quantity of blow air to be easily adjusted by adjusting the pressure of the blow air which flows through it during the blowing in process.

It is advantageous that the air blowing in line is connected to the inlet duct via a blowing in duct or a blowing in line, the blowing in duct or the blowing in line being mounted in the cylinder head of the engine or being arranged in the inlet duct since this prevents selective blowing in, for example independently of the pressure conditions in the charge air duct.

A further embodiment provides for the arrangement of the blowing in duct or of the blowing in line to be embodied in such a way that the blow air is aimed directly at the disk of the inlet valve.

Yet another embodiment provides for the arrangement of the blowing in duct or blowing in line to be embodied in such a way that the blow air is directed via the inlet valve in a spiral shape.

Another refinement provides for the embodiments above to be combined by the arrangement of the blowing in duct or of the blowing in line being embodied such that the blow air is aimed at the disk of the inlet valve and is directed via the inlet valve in a spiral shape.

These three embodiments above make it possible to adapt an advantageous flow of blow air to the conditions in cylinder heads of different construction in engines, corresponding flow conditions being achieved according to the specifications of an engine manufacturer.

In a further exemplary embodiment, a heat exchanger is arranged in the connecting line from the outlet of the second storage device to the blowing in duct or to the blowing in line. The blow air can be heated or cooled by using this heat exchanger, depending on the operating condition of the engine, allowing its efficiency to be advantageously increased to a certain degree.

Other objects, advantages and novel features of the present invention will become apparent from the following detailed description of the invention when considered in conjunction with the accompanying drawings.

BRIEF DESCRIPTION OF THE DRAWINGS

The invention will be explained using an exemplary embodiment and with reference to the appended drawing, in which:

FIG. 1 is a schematic illustration of parts of an engine with associated components with an exemplary embodiment of the device according to the invention, for carrying out the method according to the invention;

FIG. 2 is an enlarged sectional view of the region X of the engine according to FIG. 1;

FIG. 3 is a further embodiment of the illustration according to FIG. 2; and

Figure 4:
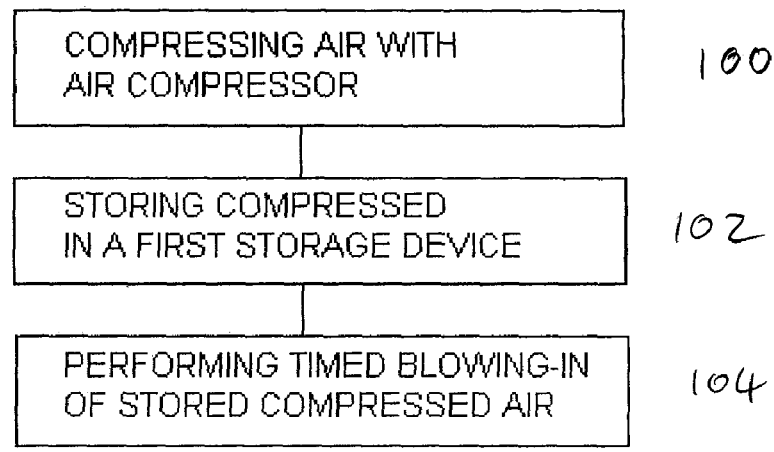
FIGS. 4-6 are flow charts showing, respectively, the overall steps of an exemplary process according to an embodiment of the invention, steps of flowing air from a first to a second storage device, and steps of a timed blowing-in of air.

Within the engine 1, which can have one or more cylinders, just one cylinder 20 is shown by way of example with, in a partial section in its upper region, a reciprocating piston 18 which is displacably arranged in said cylinder 20. The cylinder 20 is closed off at its top by a cylinder head 28, which also has one or more inlet valves 21 with one or more inlet ducts 22, and one or more outlet valves 27 with one or more outlet ducts and an exhaust line 2 connected thereto. The cylinder 20 is shown in sectional form above a crankshaft (not shown).

In this example, after a working stroke of the engine 1, the valves 21 and 27 open downwards into a combustion chamber 19, which is arranged between the upper side of the reciprocating piston 18 and the underside of the cylinder head 28. What is referred to as the intake stroke is illustrated, in which the inlet valve 21 is opened and the outlet valve 28 is closed, the reciprocating piston 18 moving in the direction of the arrow in the direction of the crankshaft in order to expand the combustion chamber 19. The method of operation of such an engine 1, in particular a diesel engine, is known and is not explained here in more detail.

A turbine 3 of what is referred to as an exhaust gas turbocharger is installed in the exhaust line 2 in a manner which is also known, the turbine 3 driving a compressor 4 which, while the engine 1 is operating, draws in air from a first air inlet 17, compresses it and feeds it to the inlet duct 22 of the engine 1 through a charge air line 6 via a charge air cooler 5, thus increasing the torque of the engine 1 in a known fashion at specific engine speeds and in specific operating states.

The charge air line 6, which is illustrated here only in a simplified schematic form, is also connected to a first port of a changeover valve 12 which is connected by a second port to a second air inlet 31. A third port of the changeover valve 12 is connected to an inlet port of an air compressor 11 whose outlet port is connected to a first storage device 10 via a dryer device 13.

The exemplary first storage device 10 serves as a compressed air storage device for a compressed air brake system of the vehicle (not illustrated) and is supplied with compressed air by the air compressor 11. The associated brake system is not illustrated.

The first storage device 10 may also be connected via a feed valve 15 to a second storage device 14 which is also used as a compressed air storage device. Its outlet port is connected via an air line 32 to an inlet of a pressure regulator 9 which is itself connected by its outlet to an inlet of a control valve 8 via a connecting line 33. The control valve 8 is connected by its outlet to an air blowing in line 7.

The air blowing in line 7 leads into the charge air line 6 in the inlet port 22 to the inlet valve 21. This arrangement is illustrated in two exemplary embodiments in an enlarged partially sectional view in FIGS. 2 and 3.

In FIG. 2, the air blowing in line 7 is mounted in the cylinder head 28 and opens into the inlet duct 22 via a blowing in duct 24. The blowing in duct 24 is arranged here in such a way that the flow of the blow air 25 is aimed at the valve disk of the inlet valve 21. An inlet flow of the inlet air is designated by the reference number 23. Both air flows 23 and 25 impinge on one another at an angle in this embodiment.

An arrangement of a blowing in line 26 in the inlet duct 22 is illustrated in FIG. 3. Here, the blowing in line 26 extends within the inlet duct 22 to just before the valve disk of the inlet valve 21, so that the blow air 25 impinges directly on the valve disk of the inlet valve 21. The inlet flow 23 and blow air 25 meet in approximately the same direction of flow here. In this example, what is referred to as blow air 25 is supplied to the respective cylinder of the engine 1 in the intake cycle in addition to the charge air, which increases the torque of the engine 1 in specific operating states.

The valves 8, 9, 12, 15 are controlled by a control device 16 which is illustrated as a block in FIG. 1. It is connected to the valves 8, 9, 12, 15 via, for example, electric connecting lines, the valves 8, 9, 12, 15 being embodied as solenoid valves.

Furthermore, the control device 16 in each case is connected electrically to one measured value signal transmitter 30 per inlet valve 21. This measured value signal transmitter 30 senses the respective position of the inlet valve 21 and converts it in a known fashion into an electrical signal which is fed to the control device 16.

In each case, one actuator element 29 per cylinder is connected to the control device 16, the actuator device 29 being located on the engine 1. In this exemplary embodiment, the device is an injection device for fuel. Further measured value signal transmitters for temperature, pressure etc. can also be contained in it. The control device 16 contains what is referred to as an engine control computer or is connected to it. From it, the control device 16 receives necessary information about the operating state of the engine 1 and of the vehicle such as, for example, the engine speed and loading of the engine 1, the velocity of the vehicle, temperatures of the engine 1, of the inlet air, of the exhaust gas and the like.

The function of the individual components for explaining the method according to the invention will be described below in more detail.

The air compressor 11 compresses air which is fed to its inlet via the changeover valve 12, either from a second air inlet 31 or from the charge air line 6. When the engine 1 is started, the changeover valve 12 connects the air compressor to the second air inlet 31 at low engine speeds or in specific operating states of the engine 1 and/or of the vehicle. In normal operating states of the engine 1, in which sufficient charge air is supplied by the compressor 4 of the turbocharger, the changeover valve 12 connects the air compressor 11 to the charge air line 6, so that as a result the delivery capacity of the air compressor 11 is advantageously increased and the need to install a larger and more expensive air compressor 11 and change the brake system is avoided.

The air which is compressed by the air compressor 11 is dried by the dryer device 13 in a manner known for the use of compressed air in a compressed air brake system, and is stored in the first storage device 10. A port (not illustrated) on the first storage device 10 feeds the compressed air stored in it for use in the compressed air brake system (also not illustrated) of the vehicle.

If the compressed air brake system is sufficiently supplied with compressed air, which is transmitted by pressure signal transmitters (not illustrated) of the control device 16, the second storage device 14 is filled with compressed air from the first storage device 10 via the feed valve 15. For the compressed air brake system, the feed valve 15 thus has the function of a protecting valve so that in this way no loss of compressed air from the system can occur. In this example, the control device compares the value supplied by the pressure signal transmitter with a predefinable setpoint value and switches the feed valve 15 correspondingly on or off. The feed valve 15 can also be of autonomous design.

The pressure regulator 9 at the outlet of the second storage device 14 opens and closes automatically as a function of the pressure in the interior of the second storage device 14. Here too, a control process can be carried out by the control device 16 by using a measured value signal transmitter and a pressure regulator of an electric design, which is indicated by a connecting line in FIG. 1.

In the exemplary intake cycle of the respective cylinder 20, the compressed air from the second storage device 14 is fed via the control valve 8 which is controlled by the control device 16 and via the air blowing in duct 7 to the respective cylinder 20 of the engine 1 via the inlet valve 21, which is opened at this time. In this embodiment, the position of the inlet valve 21 is sensed by the measured value signal transmitter 30. When the inlet valve 21 is closed again, this position is transmitted to the control device 16 by the measured value signal transmitter 30 so that the control device 16 correspondingly returns the control valve 8 to its closed position.

The clock times of the start and end of the blowing in of the additional blow air 25 from the second storage device 14 are selected, and can be predefined to the control device in such a way that the blow air 25 is superimposed on the inlet flow 23 which is present in the inlet duct 22.

The end of the blowing in process is specified, or can be predefined to the control device 16, in such a way that when the inlet valve 21 closes the blow air 25 does not flow back out of the cylinder 20 into the charge air line 6.

The timed blowing in of the blow air 25 into the combustion chamber 19 of a respective cylinder 20 of the engine 1 can considerably increase what is referred to as the cylinder charge of the combustion chamber 19 of the cylinder 20 as a function of the blown-in volume of the blow air 25. Decisive factors for the blown-in volume of the blow air 25 are not only the clock time, which is predefined by the control of the control time of the inlet valve 21, for example by using a known camshaft (not illustrated) of the engine 1, but also the cross section of the blowing in duct 24 and of the blowing in line 26 as well as the pressure in the second storage device 14.

The pressure in the second storage device 14 or the pressure downstream of the pressure regulator 9 constitute a variable for changing the quantity of the blow air 25. The setting of this pressure is carried out by the control device 16, for example by utilizing a predefinable setting values or by using data which is stored in a table in a memory device in the control device 16. This table data may correspond in each case to the respective operating state of the engine 1 and/or of the vehicle. As a result, the corresponding quantity of additional blow air 25 can be determined for each operating state and fed to the cylinder 20.

The larger cylinder charge then advantageously permits a higher injection rate of fuel into the combustion chamber 19 of the cylinder 20 and thus leads to a significant, advantageous power increase of the engine 1.

By integrating the control valve 8, which is timed by the control device 16, and the (also optional) pressure regulator 9 into an overall engine control electronic system of the engine control computer it is advantageously possible to precisely match the quantity of blow air 25 and an increase in the injection rate of fuel to one another, for example using the above mentioned table values stored in the control device 16.

At the higher power level of the engine 1, a relatively large quantity of exhaust gas is produced in the cylinder 20 which is supercharged in the way described above, the quantity of exhaust gas being discharged into the exhaust gas line 2 and thus being used directly for the acceleration of the turbine 3 of the turbocharger.

This ensures that after only a few revolutions of the crankshaft of the engine 1 with the additional quantity of blow air 25 the turbocharger "starts" correspondingly earlier and consequently supplies the engine with sufficient charge pressure through the charge air line 6.

After a sufficient charge pressure has been reached, the additional blow air 25 via the control valve 8 may be switched off immediately by the control device 16.

If the charge pressure should drop below a desired amount, which can also be predefined in the control device 16, in the dynamic operating state of the engine 1, for example in acceleration phases, the control device 16 can activate the supply of additional blow air in these phases as desired.

As a result, when an engine characteristic diagram is present, for example in table values of the control device 16, the necessary quantity of additional blow air 25 and a correspondingly increased injection quantity of fuel can be determined advantageously for any desired operating state of the engine 1 and of the vehicle, and can be fed to the engine 1 thus permitting an advantageous increase of the power of the engine 1.

The invention is not restricted to the exemplary embodiment described above.

It is thus possible for the blowing in duct 24 or the blowing in line 26 to be arranged in such a way that the blow air 25 impinges directly on the valve disk of the inlet valve 21 and thus flows with what is referred to as a "tumble" flow into the combustion chamber 19 of the cylinder 20.

The blowing in duct 24 or the blowing in line 26 can also be arranged in such a way that the blow air 25 is directed via the inlet valve 21 in a spiral shape and thus generates, in the combustion chamber 19, an air swirl which rotates about the longitudinal axis of the cylinder 20.

The blow air 25 can also be directed in such a way that a superimposition of "tumble" and swirl flow is produced.

Furthermore it is conceivable for the feed valve 15 to be embodied as an autonomous valve which is often used for compressed air systems.

The actuator element 29 can also be coupled to an actuating device for control times of the camshaft.

Furthermore, the invention can be applied to engines 1 with one or more cylinders 20 with one or more inlet valves 21, the design of the engine 1 not being restricted to a diesel engine.

It is furthermore conceivable for the blow air 25 to pass through a heat exchanger 90 before it is blown into the cylinder 25 so that its temperature can be adapted in an optimum way to the respective operating state of the engine 1.

Furthermore, a vehicle without a compressed air brake system can have just the second storage device 14 instead of two storage devices 10 and 14, which allows the feed valve 15 to be dispensed with.

Figure 5:
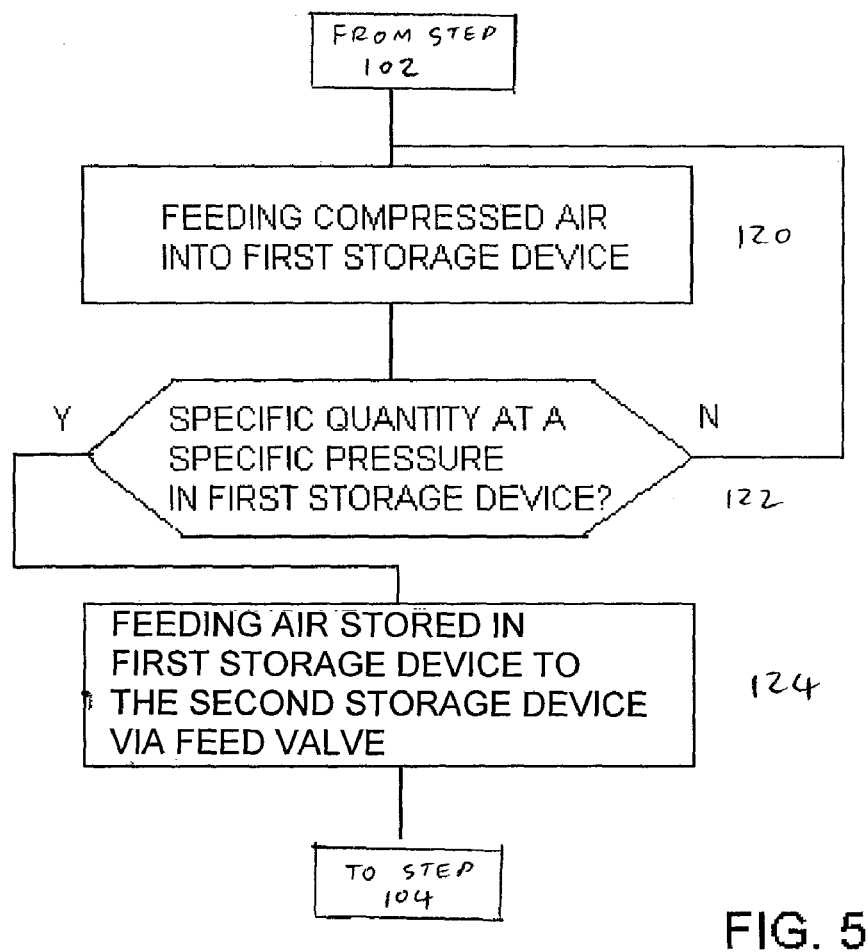
Figure 6:
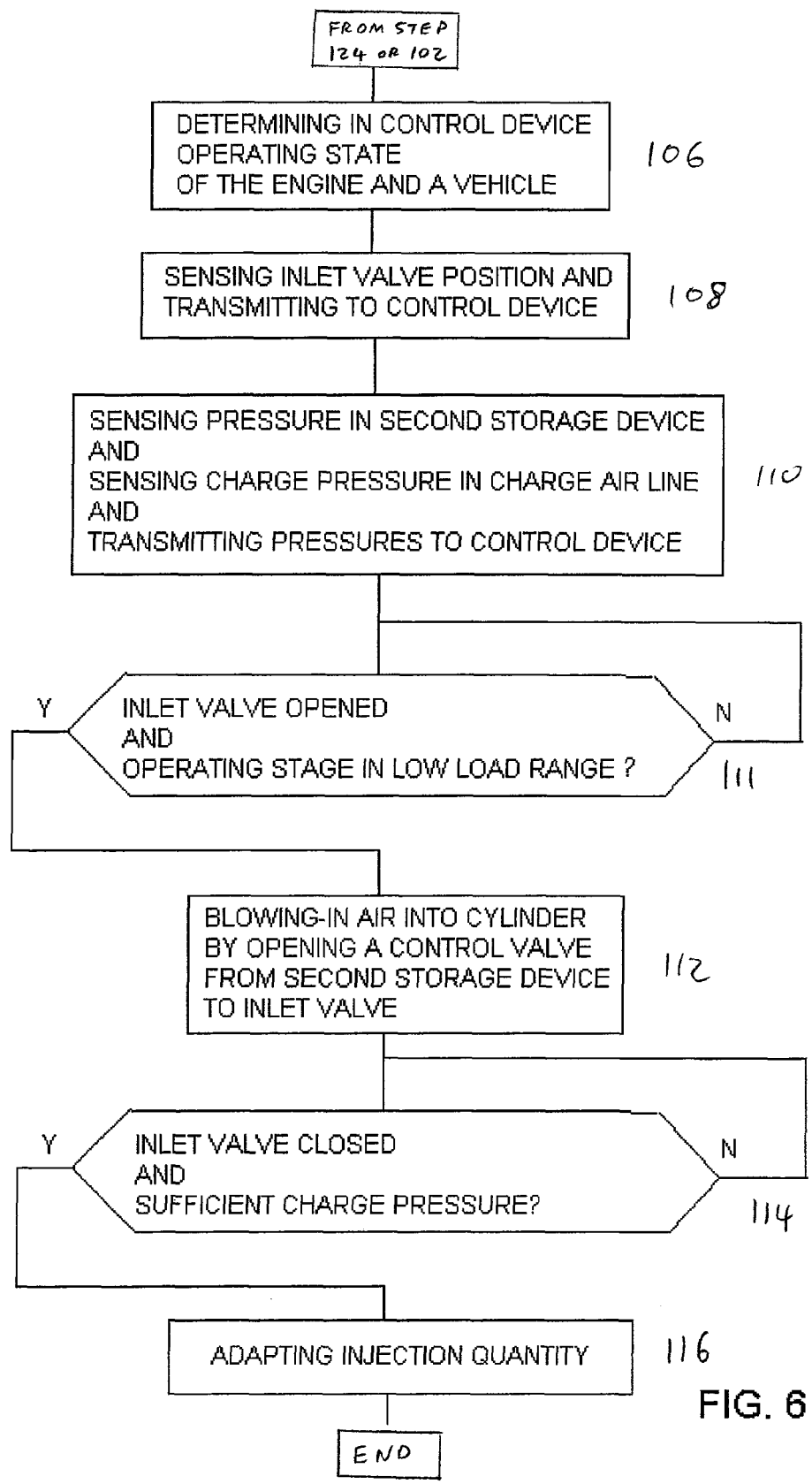

The method steps according to an exemplary embodiment of the invention are described with respect to FIGS. 4-6. FIG. 4 shows an overall exemplary process according to the invention. In step 100, there is compression of air from a charge air line or from a second air inlet by the air compressor, followed by step 102 in which storage of air compressed by the air compressor in a storage device takes place. Step 104 commands the timed blowing in of blow air, which is stored as compressed air in the storage device, into the cylinder, through an inlet valve of the cylinder, in order to increase the torque of the engine.

FIG. 5 shows the exemplary method when two storage devices are used, and takes place between the above steps 102 and 104. In step 120, compressed air is fed to the first storage device. If the first storage device contains at least a specified or preselected quantity of air at a specified or preselected pressure, as determined in step 122, then air flows to the second storage device, via a feed valve, as shown in step 124.

FIG. 6 shows detailed steps of the timed blowing-in of step 104. The timed blowing-in step further comprises, in step 106, determination by the control device of the operating state of the engine and of the vehicle, using data from an engine control computer and/or from suitable measured value signal transmitters. The method continues in step 108, with sensing of the position of the inlet valve using a measured value signal transmitter, and transmitting this information to the control device. In step 110, a pressure in the second storage device is sensed using a measured value signal transmitter and/or a pressure regulator, as well as a charge pressure in the charge air line. This information is then transmitted to the control device.

Step 111 determines if the inlet valve is open and the operation in low load range. If so, the process goes to step 112, which describes the blowing in of blow air into the cylinder by opening the control valve in a connecting line from the second storage device to the inlet valve. The blowing in of blow air into the cylinder terminates if the inlet valve is closed and if there is a sufficient charge pressure of the compressor, as shown in step 114. The method continues in step 116, with adapting an increased injection quantity of fuel in accordance with the data available.

The following list of reference numerals is provided to simplify understanding of the drawings and description of an embodiment of the present invention.

1 Engine
2 Exhaust line
3 Turbine
4 Compressor
5 Charge air cooler
6 Charge air line
7 Air blowing in duct
8 Control valve
9 Pressure regulator
10 First storage device
11 Air compressor
12 Changeover valve
13 Dryer device
14 Second storage device
15 Feed valve
16 Control device
17 First air inlet
18 Reciprocating piston
19 Combustion chamber
20 Cylinder
21 Inlet valve
22 Inlet duct
23 Inlet flow
24 Blowing in duct
25 Blow air
26 Blowing in line
27 Outlet valve
28 Cylinder head
29 Actuator element
30 Measured value signal transmitter
31 Second air inlet
32 Air line
33 Connecting line The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for increasing the torque of a reciprocating piston internal combustion engine, having at least one cylinder, a turbine, a compressor, an air compressor, at least one storage device, a charge air line, and a control device, the method comprising the steps of:

compressing air from one of the charge air line and a second air inlet with the air compressor and feeding the compressed air into a first storage device;

storing the air compressed by the air compressor in the first storage device, and feeding the air which is stored in the first storage device into a second storage device via a feed valve for storage in the second storage device when a predefined quantity of air is present at a predefined pressure in the first storage device; and performing timed blowing-in of blow air, stored as compressed air in the second storage device, into the at least one cylinder through an inlet valve of the cylinder during a cylinder intake phase, wherein each of the at least one cylinders is provided with a blow air outlet, each blow air outlet being arranged to direct blow air directly toward the inlet valve of the blow air outlet's cylinder, wherein the timed blowing-in further comprises the steps of:

determining an operating state of the engine and of a vehicle, by using the control device, with data from one of an engine control computer and a measured value signal transmitter;

sensing a position of the inlet valve via the measured value signal transmitter and transmitting this information to the control device;

sensing a pressure in the second storage device via one of a second measured value signal transmitter and a pressure regulator, sensing a charge pressure in the charge air line, and transmitting the sensed pressures to the control device;

blowing-in blow air into the cylinder by opening a control valve in a connecting line from the second storage device to the inlet valve, by using the control device, to blow in blow air when the inlet valve is opened and an operating state of the engine in the low load range is present;

terminating the blowing-in of blow air into the cylinder when one of the inlet valve is closed and there is a sufficient charge pressure of the compressor; and increasing an injection quantity of fuel, in accordance with data from at least one of the engine control computer, the measured value signal transmitter, the sensed position of the inlet valve, the sensed pressure in the second storage device and the operating state of the engine.

2. The method as claimed in claim 1, further comprising the act of controlling the feed valve with the control device.

3. The method as claimed in claim 1, further comprising defining a time segment for opening the control valve by the control device using one of a pre-definable and stored data value.

4. The method as claimed in claim 1, further comprising adjusting with the control device a quantity of blow air as a function of a respective operating state of the engine and of a vehicle by using a pressure regulator.

5. The method as claimed in claim 1, wherein an inlet of the air compressor is respectively connected via a changeover valve to one of the second air inlet and to the charge air line as a function of a pressure in the charge air line.

6. The method as claimed in claim 1, wherein the internal combustion engine further comprises an air dryer and a charge air cooler.

7. The method as claimed in claim 1, wherein the internal combustion engine is a diesel engine.

8. A device for increasing the torque of a reciprocating piston internal combustion engine, comprising:

at least one cylinder;
a turbine;
a compressor;
an air compressor;
first and second storage devices for compressed air with outlets, a charge air cooler disposed in a charge air line to the cylinder;

a feed valve connecting the first and second storage devices to control flow therebetween;

a control device for performing timed blowing-in of blow air from the second storage device, into the cylinder through an inlet valve of the cylinder, during a cylinder intake phase, to increase torque; and a blow air outlet for each of the at least one cylinders, each blow air outlet being arranged to direct blow air directly toward the inlet valve of the blow air outlet's cylinder, wherein the outlet of the second storage device is connected to the blow air outlet by an air blowing-in line via a control valve, the air blowing-in line is connected to the blow air outlet via one of a blowing-in duct and an extended blowing-in line, the one of the blowing-in duct and the extended blowing-in line being mounted in one of the cylinder head of the engine and the inlet duct, the one of the blowing-in duct and the extended blowing-in line aim the blow air directly at the disk of an inlet valve from within an intake port of each of the at least one cylinders, and the one of the blowing-in duct and the extended blowing-in line direct the blow air via an inlet valve in a spiral shape.

9. The device as claimed in claim 8, further comprising an inlet of the second storage device connected to the first storage device via a feed valve.

10. The device as claimed in claim 9, further comprising a pressure regulator connecting the control valve and an outlet of the second storage device.

11. The device as claimed in claim 8, further comprising a heat exchanger disposed in a connecting line from the outlet of the second storage device to one of the blowing-in duct and the blowing-in line.

12. The device as claimed in claim 8, wherein the internal combustion engine is a diesel engine.

13. The device as claimed in claim 8, wherein the control device commands compressed air stored in the first storage device to flow in the second storage device for storage therein, when at least a predefined quantity of air is present at a predefined pressure in the first storage device.

14. A method for increasing the torque of a reciprocating piston internal combustion engine of a vehicle, having at least one cylinder, a turbine, a compressor, an air compressor, at least one storage device, a charge air line, and a control device, the method comprising the steps of:

compressing air from one of a charge air line and a second air inlet with the air compressor and feeding the compressed air into a first storage device;

storing the air compressed by the air compressor in the first storage device, and feeding the air which is stored in the first storage device into a second storage device via a feed valve for storage in the second storage device, when a predefined quantity of air is present at a predefined pressure in the first storage device; and performing timed blowing-in of blow air, stored as compressed air in the second storage device, into each of the at least one cylinders, each of the at least one cylinders having a blow air outlet arranged to direct blow air directly toward an inlet valve of the blow air outlet's cylinder through the inlet valve of the cylinder during a cylinder intake phase, wherein the timed blowing-in further comprises the steps of:

determining an operating state of the engine and of a vehicle, by using the control device, with data from one of an engine control computer and a measured value signal transmitter;

sensing a position of the inlet valve via the measured value signal transmitter and transmitting this information to the control device;

sensing a pressure in the second storage device via one of a second measured value signal transmitter and a pressure regulator, sensing a charge pressure in the charge air line, and transmitting the sensed pressures to the control device;

blowing-in blow air into the cylinder by opening a control valve in connecting line from the second storage device to the inlet valve, by using the control device, to blow in blow air when the inlet valve is opened and an operating state of the engine in the low load range is present;

terminating the blowing-in of blow air into the cylinder when one of the inlet valve is closed and there is a sufficient charge pressure of the compressor; and increasing an injection quantity of fuel, in accordance with data from at least one of the engine control computer, the measured value signal transmitter, the sensed position of the inlet valve, the sensed pressure in the second storage device and the operating state of the engine.

15. The method according to claim 14, further comprising:
adjusting a quantity of blow air;
adjusting control times of the inlet valve; and
adjusting an injection rate of fuel into the engine so as to be matched to one another by the control device as a function of an operating state of the engine, using predefinable stored table values.

16. The method according to claim 14, wherein the predefined quantity and pressure are selected to prevent a compressed air braking system of the vehicle from suffering a loss of compressed air.

* * * * *